Figure 1:
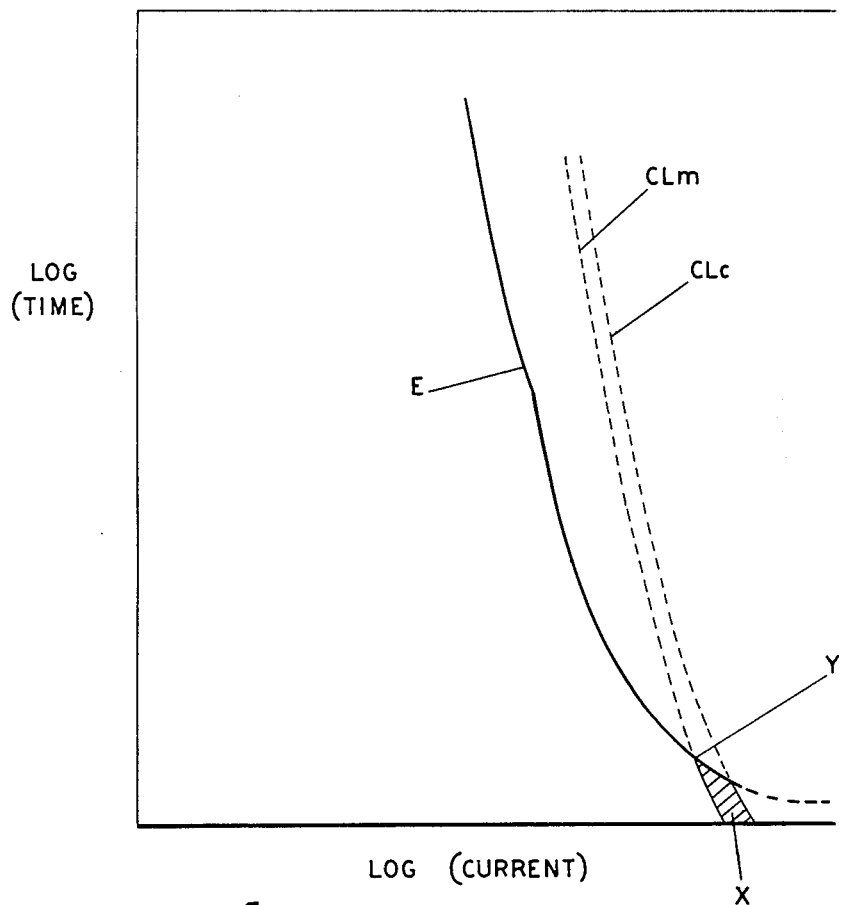

United States Patent [19]

Westrom

[11] 4,002,949
[45] Jan. 11, 1977

[54] TRANSFORMER PROTECTIVE SYSTEM
[75] Inventor: Arthur C. Westrom, Stone Mountain, Ga.
[73] Assignee: Kearney-National Inc., Atlanta, Ga.
[22] Filed: Nov. 13, 1975
[21] Appl. No.: 631,437
[52] U.S. Cl. .............................. 317/15; 317/14 R; 317/14 C; 337/32; 337/204
[51] Int. Cl.² ........................................ H02H 7/04
[58] Field of Search ............... 317/15, 40 A, 14 R, 317/14 C, 14 F; 337/32, 31, 30, 199, 202, 203, 204, 221, 277, 281, 249, 250, 257

[56] References Cited
UNITED STATES PATENTS

| | | | |
|---|---|---|---|
| 2,337,353 | 12/1943 | Smith, Jr. et al. | 337/204 X |
| 3,179,851 | 4/1965 | Smith, Jr. | 317/16 X |
| 3,292,048 | 12/1966 | Swoish et al. | 317/15 |
| 3,524,105 | 8/1970 | Harner et al. | 317/15 |
| 3,588,606 | 6/1971 | Ristuccia | 317/15 |
| 3,916,259 | 10/1975 | Russell et al. | 317/15 |
| 3,953,818 | 4/1976 | Martin et al. | 317/15 X |

Primary Examiner—J D Miller
Assistant Examiner—Patrick R. Salce
Attorney, Agent, or Firm—Walter M. Rodgers; Walter A. Rodgers

[57] ABSTRACT

A current limiting fuse and an oil expulsion or weak link type fuse are connected in series with each other and with a transformer primary winding and a grounded element having a part disposed adjacent one end of the expulsion fuse is arranged so that an arc drawn upon operation of the expulsion fuse is directed to the grounded element in such manner as to cause the current limiting fuse to operate and interrupt the flow of current through the primary winding. The system is applicable to single phase or multiple phase arrangements.

9 Claims, 3 Drawing Figures

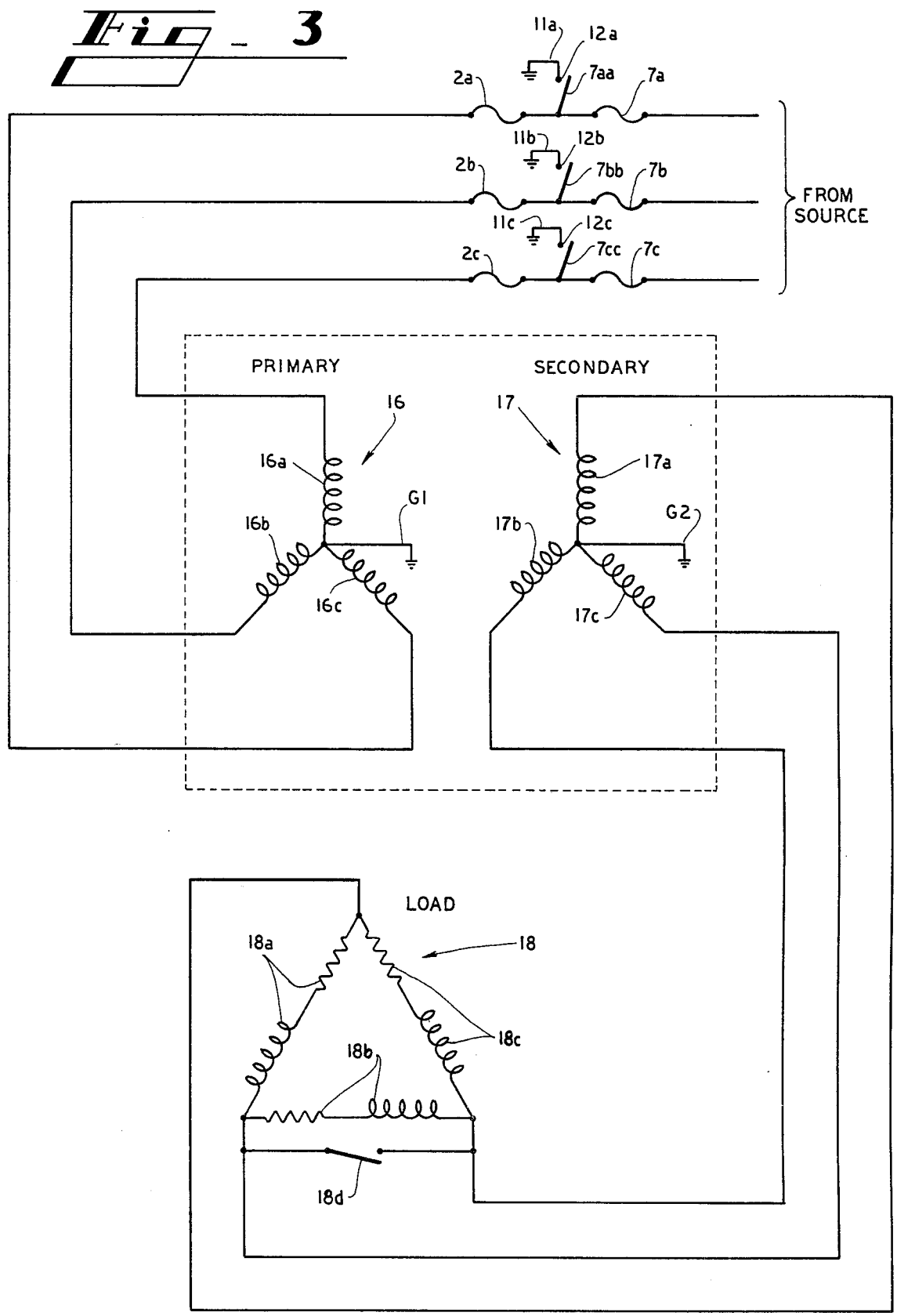

TRANSFORMER PROTECTIVE SYSTEM

The use of a current limiting fuse connected in series with an oil expulsion fuse and a primary transformer winding has become widespread and constitutes an effective means for protecting oil filled transformers. When properly designed, the oil expulsion fuse affords protection against low current fault conditions while the current limiting fuse affords protection for high current faults. The relatively inexpensive oil expulsion fuse thus affords protection for faults external to the transformer as a general rule while the current limiting fuse being a totally enclosed structure and being considerably more expensive than the oil expulsion fuse affords protection for the transformer against internal high current faults such as short circuits to ground. The time current characteristic curves of the two fuses are arranged so that they intersect at a point which represents a magnitude of current which is in excess of the magnitude of let through current which can flow for a bolted secondary fault.

Thus if the oil expulsion fuse should operate it is simply replaced by any suitable procedure such as that disclosed and claimed in U.S. Pat. application Ser. No. 459,173 filed Aug. 8, 1974 - Russell et al, now U.S. Pat. No. 3,916,259. Should the current limiting fuse be called upon to operate, the required magnitude of current flow is only attainable by a fault internal to the transformer. Transformer internal faults are normally not repairable. Thus if the current limiting fuse operates under conventional current practice, it is empirical procedure simply to replace the entire transformer.

The two fuse system works well for voltages on single phase arrangements which are not substantially in excess of 34.5 KV and for three-phase equipment where the line voltage does not substantially exceed 23 KV. The inability of the oil expulsion fuse to withstand a higher recovery voltage following an interrupting operation is due to the fact that the recovery withstand voltage of such a fuse is a direct function of the length of the fuse since the fuse simply comprises a tubular element of insulating material having terminals at each end to which the ends of a fusible element disposed within the tube are connected. On the other hand the interrupting rating of such a fuse is inversely related to its voltage rating so that if the length of the fuse is increased in such manner as to render the device capable of withstanding higher recovery voltages, the fuse is automatically rendered incapable of interrupting correspondingly higher fault currents. Furthermore arc energy of an expulsion fuse is directly related to fuse length because of the confining effect of the tubular enclosure so that an increase in fuse length automatically imposes an increase in arc energy. In addition pressure developed in oil filled transformer tanks is directly related to arc energy. For these reasons, the two-fuse protective system for oil filled distribution type power transformers has been limited to the maximum voltages as discussed above.

According to this invention the two-fuse protective system which is presently known is rendered adaptable for use in conjunction with oil filled transformers which have voltage ratings considerably in excess of 34.5 KV for single phased units or 23 KV for three-phase arrangements. More specifically and in accordance with the invention in one form, a grounded element is arranged so that a part thereof is disposed within the transformer tank and underneath the oil at one end of the expulsion fuse and arranged so that an arc drawn upon operation of the expulsion fuse causes the products of the arc and the arc itself to be directed to the adjacent part of the grounded conductor and in this manner creates a low impedance line to ground fault which initiates the melting of the current limiting fuse which in turn promptly interrupts the current flow and opens the circuit. Stated otherwise, the invention for current applications allows the use of an oil expulsion fuse having a voltage rating well below that currently required for fault conditions. This lower rated oil expulsion fuse may be substantially shorter in length because it is never required to withstand the recovery voltage because the current limiting fuse is operated and serves this function. Furthermore the shorter lower voltage oil expulsion fuse reduces the arc energy and in turn effects a corresponding reduction in pressures produced in the oil filled transformer tank. Also, when the oil fuse arc is transferred to ground, a further reduction in arc energy is effected for a given $I^2t$ let through of the current limiting fuse since the open arc in oil produces only one-sixth the arc energy produced by an oil expulsion fuse of equal length. In addition the ground plane terminal can be located from one to two inches from the vent of the oil fuse thereby resulting in a further reduction in arc energy produced during the fault. Thus the oil expulsion fuse interrupting rating is no longer critical to the application since it is only required to withstand the $I^2t$ let through current up until the time of the transfer of the arc to ground and such time is quite brief of the order of a small fraction of a cycle.

Figure 2:
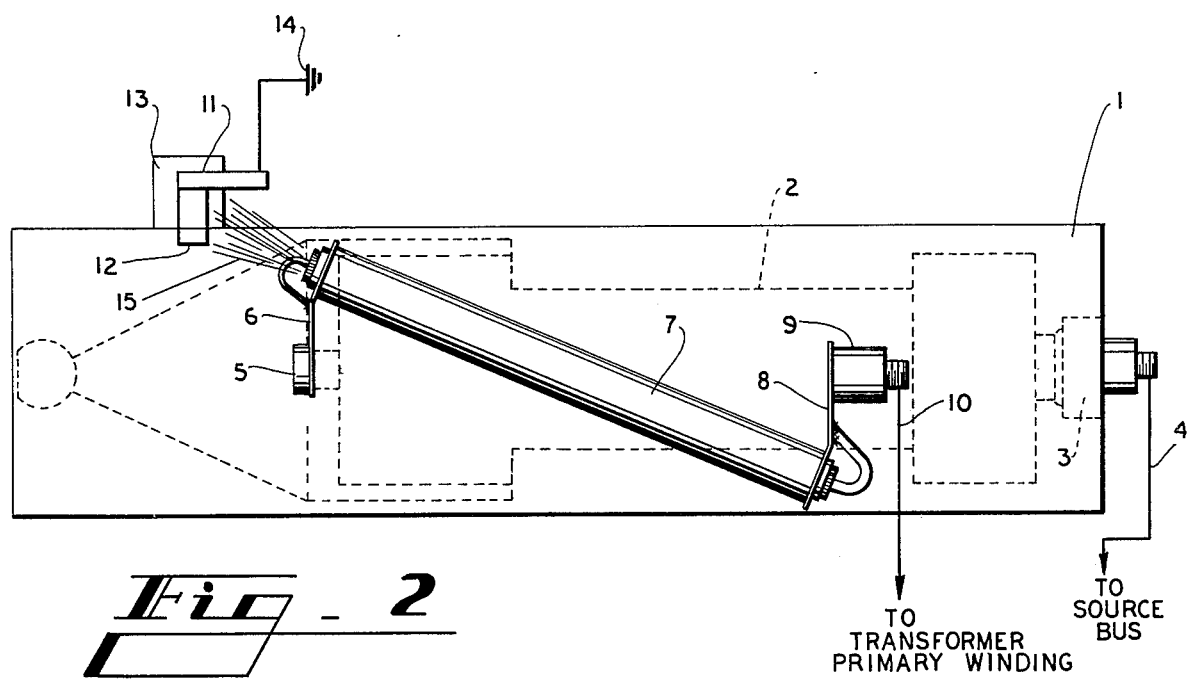

For a better understanding of the invention, reference may be had to the accompanying drawings in which FIG. 1 is a time current chart for conventional current limiting and oil expulsion type fuses connected in series and mounted within a transformer tank and below the level of oil;

FIG. 2 is a more or less schematic arrangement for mounting whereby current limiting and oil expulsion fuses are connected in series and arranged so that one end of the oil expulsion fuse exhausts in the direction of a grounded element; and in which FIG. 3 is a schematic wiring diagram showing the primary and secondary windings of a three-phase Y-connected transformer to the secondary of which a delta connected load is connected, the current limiting and oil expulsion fuses being arranged in series with each phase of the primary winding and each expulsion fuse being arranged adjacent a grounded element having a part disposed adjacent one end of the associated oil expulsion fuse.

With reference to the time-current chart designated FIG. 1, the curve E represents the expulsion fuse such as 7. The curve CLm is the minimum melting time curve and the curve CLc is the total clearing time curve for the current limiting fuse 2. The cross-hatched area designated X is of course the region in which the current limiting fuse operates under extreme fault conditions while the point designated Y is the cross-over point of the time current characteristics E and CLm.

With reference to FIG. 2 the numeral 1 generally designates a support structure in the form of a hollow tubular insulating element disposed within a transformer tank and below the level of oil. Mounted within support structure 1 is a current limiting fuse designated by the numeral 2. Fuse 2 is provided with terminal 3 which is connected through conductor 4 to a source bus. Current limiting fuse 2 also includes a terminal 5 which is connected by means of conductor 6 with oil expulsion fuse 7 mounted on support structure 1 and connected through conductors 8, terminal 9, and conductor 10 with one extremity of a transformer primary winding not shown.

According to this invention, a conductor 11 is provided with a grounded element 12 which is disposed inside the transformer tank and which is supported by an insulating block 13 and grounded as indicated at 14. The term "grounded element" is intended to include a grounded transformer tank. Thus when a fault condition develops which is of a relatively low order of magnitude such for example as might be caused by a fault external to the transformer and which causes the oil expulsion fuse to operate, an arc generally designated at 15 is directed toward part 12 of grounded element 11 and by this means a short circuit to ground is established from conductor 4 through terminal 3, current limiting fuse 2 and conductor 11 to ground. Of course such a short circuit causes the current limiting fuse 2 to operate. Since the current limiting fuse melting and clearing element is totally enclosed, operation of this fuse does not liberate external energy nor cause an increase in pressure within the tank. Furthermore this action of the current limiting fuse effectively disconnects the transformer primary winding from the source bus. As explained above, the oil expulsion fuse may be made quite short in length compared to prior practice. Thus the shorter expulsion fuse discharges reduced fault energy into the oil as a consequence of the fuse operation for any condition of fault current, first because of the shorter fuse length confining the arc and second because the arc duration inside the fuse is limited by the transfer of the arc to part 12 of the grounded element. The arc 15 from the fuse terminal to ground is effectively limited by the let through energy of the current limiting fuse to control the added pressure increase under oil. Conversely the system according to this invention may be employed and oil expulsion fuses such as 7 with ratings far below those currently deemed necessary according to presently known practices may be used in conjunction with transformers having ratings substantially in excess of those to which the dual fuse system is now applied as explained above since it may be more economical to sacrifice the higher cost fuse than to construct a stronger transformer. The arrangement of FIG. 2 may take the form of that disclosed and claimed in the above mentioned U.S. Pat. No. 3,916,259.

Not only is the protective system of this invention applicable to single-phase transformers, the system is also applicable to multi-phase units such as the three-phase system schematically shown and designated FIG. 3. In FIG. 3, a Y-connected primary winding generally designated by the numeral 16 is arranged so that phase winding 16a is connected in series with current limiting fuse 2a and oil expulsion fuse 7a and the open end of fuse 7a designated schematically at 7aa is arranged in close proximity to the adjacent part 12a of grounded element 11a. Phases 16b and 16c are connected in like manner in series with current limiting and expulsion fuses together with the grounded conductors as explained in connection with phase 16a. The neutral of the primary winding 16 is grounded as indicated at G1.

The secondary of the three-phase transformer shown in FIG. 3 is designated generally by the numeral 17 and its phases are designated 17a, 17b, and 17c. The grounded neutral of the Y-connected secondary winding 17 is designated G2.

The load circuit connected to the secondary 17 is designated generally as 18 and is delta connected. The phases are designated 18a, 18b, and 18c. A non-activated fault is schematically represented across phase 18b by the numeral 18d. This system of course could constitute a test set up for verifying the principles of the invention as explained above.

The systems shown in both FIGS. 2 and 3 are characterized by the fact that the ends of the current limiting fuse such as 7, 7a, 7b and 7c which are disposed respectively adjacent the grounded parts 12, 12a, 12b and 12c are adjacent the terminal of the oil expulsion fuse which is connected directly to terminal 5 of the associated current limiting fuse. Of course the opposite terminal of each current limiting fuse is directly connected to an appropriate source conductor while the other terminal of each oil expulsion fuse is directly connected in series with its associated transformer winding.

Since the invention contemplates forced operation of the current limiting fuse such as that designated in FIG. 2 by the numeral 2 in each instance wherein the oil expulsion fuse 7 is called upon to operate, it is desirable to provide convenient means whereby both fuses may readily be removed and replaced so that the associated transformer may be efficiently and quickly restored to service. Toward this end an arrangement such as shown in FIG. 2 or such as is disclosed in the above mentioned U.S. application Ser. No. 459,173 has been found desirable.

For some applications of the invention, it may be desirable simply to cause the products of arcing which are expelled from the fuse 7 to strike an adjacent grounded wall of the transformer and to cause the fuse 2 to arc directly to the transformer wall.

The arrangement described above contemplates mounting both the oil expulsion and the current limiting fuses within the tank of the protected transformer. It will be understood, however, that for some applications of the invention, the current limiting fuse may be mounted outside the tank of the protected transformer.

The invention may be contrasted with known arrangements in which a high speed fault responsive mechanical ground switch is closed to cause a circuit breaker or fuse to operate and thus to clear the protected apparatus of the fault condition. The present invention is superior to a mechanical switch in terms of size, cost and speed of operation while having the unique capacity to eliminate the ground fault automatically following the circuit clearing by the current limiting fuse. Thus in the latter case, the circuit can be restored without disconnecting the protected transformer from the system.

The embodiments of the invention in which an exclusive property or privilege is claimed are defined as follows:

1. A transformer protective system comprising a current limiting fuse and an oil expulsion fuse connected in series with each other and with a transformer primary winding, the oil expulsion fuse being of such length that it is incapable of withstanding the recovery voltage following an interrupting operation, and a grounded element having a part disposed adjacent the end of said expulsion fuse which is connected to said current limiting fuse and arranged so that an arc drawn upon operation of said expulsion fuse causes the products of such arc to be directed to said grounded element thereby to cause an arc to be established between said grounded element and said current limiting fuse to cause said current limiting fuse to operate and interrupt the flow of current through said primary winding, the current limiting fuse being capable of withstanding the recovery voltage following an interrupting operation.

2. A system according to claim 1 wherein said one end of said expulsion fuse is directly connected to one terminal of said current limiting fuse and wherein the other end of said current limiting fuse is directly connected to a source conductor.

3. A system according to claim 1 wherein the time current characteristics of said fuses intersect at a current the magnitude of which is in excess of the magnitude of the let-through current of a bolted secondary line to line fault.

4. A system according to claim 1 wherein both fuses are disposed within the tank of the protected transformer.

5. A system according to claim 1 wherein said current limiting fuse is disposed outside of the tank of the protected transformer.

6. A fuse protective system for a three-phase transformer having Y-connected grounded neutral primary and secondary windings said system comprising a current limiting fuse and an oil expulsion fuse connected in series with each other and with each phase of the primary winding, each oil expulsion fuse being of such length that it is incapable of withstanding the recovery voltage following an interrupting operation, the fuses of each phase being mounted adjacent their associated phase, and a grounded element having a part disposed adjacent the end of each of said expulsion fuses which is connected to the associated current limiting fuse and arranged so that the products of an arc drawn by an expulsion fuse are directed to the associated grounded element thereby to cause the associated one of said current limiting fuses to operate and interrupt the flow of current through the associated faulted phase winding, each current limiting fuse being capable of withstanding the recovery voltage following an interrupting operation.

7. A protective system according to claim 6 wherein one terminal of each oil expulsion fuse is directly connected to the ungrounded terminal of one primary phase and wherein the other terminal of each oil expulsion fuse is directly connected to one terminal of the associated current limiting fuse.

8. A system according to claim 7 wherein the other terminal of each current limiting fuse is directly connected to a source conductor.

9. A system according to claim 7 wherein a part of each of said grounded elements is disposed adjacent said other terminal of the associated oil expulsion fuse and in the path of the products of an interrupting operation which are expelled through the open end of said oil expulsion fuse adjacent said other terminal.

* * * * *